3,504,746
METHOD OF SEALING A WALLED SYSTEM WITH POLYVINYL PYRROLIDONE
Milton Freifeld and George S. Mills, Boonton, N.J., assignors to GAF Corporation, New York, N.Y., a corporation of Delaware
No Drawing. Continuation-in-part of application Ser. No. 502,385, Oct. 22, 1965. This application June 19, 1968, Ser. No. 738,108
Int. Cl. C09k *3/12;* E21b *33/138*
U.S. Cl. 166—295                   9 Claims

ABSTRACT OF THE DISCLOSURE

In a method of sealing a walled system against fluid passage through its walls, the improvement which comprises injecting into the system and into any proosity in its walls an aqueous water-shutoff substantially ungelled, non-crosslinked composition comprising a mixture consisting of (1) a 1% to 20% aqueous solution of polyvinyl pyrrolidone polymer having a Fikentscher (K) value of 20 to 150 and (2) a catalytic amount of a redox catalyst system consisting essentially of hydrazine and a peroxide polymerization catalyst in a molar ratio of at least two moles of peroxide to one mole of hydrazine.

---

This application is a continuation-in-part of our application Ser. No. 502,385 filed Oct. 22, 1965, now abandoned.

This invention relates to methods and compositions for sealing permeable walled systems and more particularly, to sealing methods employing compositions for catalytically cross-linked polyvinyl pyrrolidone polymers.

There are numerous applications where it is desirable to seal such systems, including permeable porous earth formations. One of these applications is in the treatment of subsurface earth formations which are producing petroleum. Often petroleum producing subsurface earth formations are near other formations which are producing unwanted fluids, such as water or gas. Since production of these unwanted fluids reduces the efficiency of the petroleum production process, production of these unwanted fluids should be reduced or eliminated. Various ingenious techniques have been developed to reduce or eliminate production of these fluids. One technique is to inject cement slurries into the formations producing these unwanted fluids. This technique is useful where the formations contain large channels or fissures through which sufficient cement particles can be forced to form a satisfactory seal. However, if channels are so small that cement particles cannot be forced into the permeable sections, a satisfactory seal cannot be obtained.

Polymeric organic materials are also used in sealing permeable formations. These materials are usually employed in the form of monomers or low molecular weight polymers which can be further polymerized after they have been injected into the permeable formation. Since most of these useful polymerizable materials are water insoluble, polymerization in the permeable formation presents special problems. If these materails are liquids, they may be injected directly into the formation. If they are solids, they are dissolved in suitable solvents before they are injected into the formation. In either event, polymerization of these organic materials in the formation must be carefully controlled if satisfactory results are to be obtained. Usually these materials are polymerized by thermal methods, catalytic methods, or a combination of these methods. When they are thermally polymerized, close control over temperature conditions in the formation being treated must be maintained. When they are catalytically polymerized, close control must be maintained over the concentrations of polymerizable materials and catalysts present in the formation, so that variations in concentrations do not produce unsatisfactory results. Attention must also be paid in particular to factors such as reaction or dilution of the catalyst or polymerizable materials with water or other fluids present in the formation.

An object of the present invention is to provide methods and compositions for sealing permeable earth formations to reduce or eliminate the influx of unwanted fluids. Another object is to provide novel compositions of catalytically cross-linked polyvinyl pyrrolidone polymers, which will form permanent polymeric gels that are useful in sealing permeable earth formations. Another object is to provide compositions which can be gelled after they are introduced into the permeable earth formation which is being sealed. Further objects include the provision of similar methods and compositions for sealing any other types of walled systems against fluid passage through the walls thereof. Other objects and advantages of this invention will appear as this description proceeds.

The objects of the present invention are attained by injection of dilute aqueous liquid compositions of polyvinyl pyrrolidone polymers mixed with suitable amounts of catalytic cross-linking agents into permeable walled systems so that the compositions penetrate the interstices of the porous medium, fill the communicating pores and subsequently cross-link individual molecules of polyvinyl pyrrolidone polymers in the composition to forming permanent gels which seal the walls and prevent further flow of fluids therethrough. These compositions are novel in that they form permanent gels which have non-shrinking properties.

The compositions have the added advantage that their initial viscosities may be varied over wide ranges by proper choices of molecular weights and solution concentrations of polyvinyl pyrrolidone, so that the compositions having the optimum initial viscosities for the particular system being treated may be chosen. The compositions have the further advantage that water-soluble cross-linking catalyst systems which are compatible in the aqueous composition may be employed so that uniform penetration of both polyvinyl pyrrolidone polymers and catalytic cross-linking agents into the permeable formation occur. These compositions have the further advantage that they are prepared in aqueous media so that dilution with water present in the formation being treated does not adversely affect the gelation process. These compositions have the further advantage that the gelation or setting time of the polymeric materials may be controlled within sufficiently close limits so that optimum penetration into permeable formation is effected. These aqueous compositions have advantages over commercial sealing agents, such as ethyl hexyl titanate, which are water insoluble and must be used in the form of solutions in water-immiscible solvents so that premature reaction with water is avoided or minimized.

Polyvinyl pyrrolidone polymers which may be used in this invention are available commercially in a variety of forms, concentrations and molecular weights. Methods for the manufacture of these polymers are well-known in the art. Polymers having molecular weights from 50,000 to 2 million or higher may be used, while those polymers having molecular weights from 50,000 to 350,000 are normally employed in the practice of this invention. Polyvinyl pyrrolidone polymers may be prepared from N-vinyl-2-pyrrolidone (otherwise referred to as 1-vinyl-2-pyrrolidone) by the methods disclosed in U.S. Patents 2,265,450 and 2,335,454. The monomer, N-vinyl-2-pyrrolidone is prepared in known manner by N-vinylation of the corresponding lactam at elevated temperatures by the method disclosed in U.S. Patent 2,317,084.

The molecular weight of N-vinyl-2-pyrrolidone polymers depends upon the degree of polymerization and relative molecular weight of the polyvinyl pyrrolidone. The molecular weight is often expressed in terms of Fikentscher K values. The method for determining these K values is given in Modern Plastics, volume 23, No. 3, 157–61, 212, 214, 216, 218 (1945). Polymers having K values of from about 20 to 150 and usually from about 60 to 90 or their mixtures are used in the practice of this invention.

The concentration of polyvinyl pyrrolidone polymers in aqueous solutions employed in this invention varies from 1 to 20% by weight with the most common concentrations being from 5 to 10% by weight. However, these concentration ranges are not to be regarded as limitative, since factors such as the molecular weight of the pyrrolidone polymer employed, the viscosity of the polymer solution, the nature of the permeable formation being fractured, the particular catalytic redox cross-linking agents employed and other factors must be taken into consideration in determining the concentration of the polymer solution.

Catalytic cross-linking agents useful in the practice of this invention are redox systems having an oxidant, e.g. a water soluble inorganic peroxygen polymerization catalyst, such as hydrogen peroxide, sodium peroxide, urea peroxide, alkali dichromates, alkali perborates, alkali persulfates, alkali permanganates, ammonium persulfate or the like, and a reductant, such as cuprous ion, alkali bisulfite, alkali metabisulfite, alkali thiosulfate, alkali ferricyanides, hydroxyl-amine, tetraethylene pentamine, hydrazine or the like. Redox catalyst systems consisting essentially of hydrazine and a peroxide polymerization catalyst in a molar ratio of at least two moles of peroxide to one mole of hydrazine are particularly suitable for use in the practice of this invention. Especially good results were obtained with redox catalyst systems containing from 2 to 30% hydrogen peroxide and from 1 to 10% hydrazine, based on the percent active material (by weight) per 100 parts of polyvinyl pyrrolidone. Such hydrogen peroxide-hydrazine redox systems usually have gelation times of from about 100 to 200 minutes which makes them well suited for use in the present invention.

It is to be understood that commercial polyvinyl pyrrolidone, commercial oxidants, and commercial reductants are normally employed in the practice of the process disclosed in this invention. Although chemically pure materials may be used in the process, their use is not necessary unless unusual conditions are encountered and commercial products cannot be used.

Compositions for use in this invention may be evaluated by the following methods. First, characteristics of cross-linking systems are investigated by measuring the times required for gelation and be examining the nature of the gels produced. This method involves placing a known concentration of polyvinyl pyrrolidone polymer solution into a 4-oz. screw-cap bottle. The desired amount of 30% peroxide solution is then added and mixed with the polymer solution. The desired amount of 10% hydrazine solution is then added and mixed with the solution. The bottle is closed and the composition agitated until gelation occurs. Little, if any, gelation occurs immediately. When gelation occurs, the time required for gelation is recorded. The working properties of the gel are examined and recorded.

The second method for evaluation of these compositions is by the water shutoff screening method. A 25 cm. column of Ottawa crystal silica packing (40–60 mesh) is placed in a Darcy tube having a length of 30 cms. and an internal diameter of 4 cms. Glass wool pads are placed at each end of the silica column to permit ready flow of fluids through the column. One-hole rubber stoppers are then placed in both ends of the tube. The tube is positioned so that the input (low) end is inclined upward at a 40° angle. Provisions are made for introduction of water into the lower end of the tube and for removal of water at the upper end of the tube by means of rubber tubing. The inlet tube is connected to a constant head reservoir filled with water and the exit tube is positioned so that water flowing through the column may be collected in a graduate. Water is allowed to flow through the column until all of the air is displaced and a constant flow rate is established through the then levelled tube. The amount of water flowing through the tube at this constant rate over a five to ten minute interval is collected in the graduate and measured. The water temperature is also recorded. These data are then used to calculate the Darcy number (K) of the column by means of the following formula:

$$K = \frac{QuL}{A\Delta P}$$

wherein:

Q—volume liquid passed, cc./sec.
$u$—viscosity of the liquid in centipoises at temperature $t$.
L—the length of the column packing
A—cross-section area of column, sq. cm.
$\Delta P$—head of the liquid in the column, in atm.

After the Darcy (K) value is determined for the column under test with water, the composition containing the water shutoff agent composition is forced into the permeable column. The composition is then allowed to stand in the column for 100 minutes before a hydrostatic head is reimposed. During this period, the composition gels in the permeable portion of the column. The Darcy (K) value is then redetermined on the treated column and indicates the amount of plugging which has occurred in the column.

The following examples are illustrative of the present invention but are not to be regarded as limitative. It is to be understood that all parts, percentages and proportions referred to herein and in the appended claims are by weight unless otherwise indicated.

EXAMPLE 1

The following four experiments designated as (a), (b), (c), and (d) demonstrate the range of times required to gel in minutes and the nature of the gels obtained. Two solutions of polyvinyl pyrrolidone polymers are prepared. One of these solutions contains 10% by weight of polyvinyl pyrrolidone polymer having a Fikentscher (K) value of 60 (average molecular weight about 150,000). The other polyvinyl pyrrolidone solution contains 5% of polymer having a Fikentscher (K) value of 90 (average molecular weight about 350,000). The hydrogen peroxide solution contains 30% hydrogen peroxide by weight and the hydrazine solution contains 10% hydrazine by weight. The compositions shown in Table 1 are prepared by placing the indicated quantity of the particular polyvinyl pyrrolidone solution into a 4 oz. screw-cap bottle. The required amount of hydrogen peroxide solution is added and mixed. The indicated amount of 10% hydrazine solution is then added. The bottle is capped and the contents mixed. Little if any thickening occurs immediately. The time to gel (mins.) is the time from the point at which all of the ingredients are added and mixed, until the time at which a satisfactory form-stable gel is obtained. Examination of these gels shows that they are stable and useful for sealing permeable formations.

TABLE 1

| Components | Parts added (g. of 100% material) | | | |
|---|---|---|---|---|
| | (a) | (b) | (c) | (d) |
| 10% PVP, K 60 | 5 | 5 | 5 | |
| 5% PVP, K 90 | | | | 2.5 |
| 30% H₂O₂ | 0.15 | 0.5 | 1.0 | 0.5 |
| 10% hydrazine | 0.05 | 0.25 | 0.5 | 0.25 |
| Time to gel (mins.) | 210 | 145 | 115 | 102 |

EXAMPLE 1A

These examples illustrate the effect of temperature of 50° C. (122° F.) on gelation with the system of Example 1.

The bottle experiments were performed as above, but the measured bottled PVP solutions were warmed in a 50° oven, closed, before addition of the redox reagents, then replaced, capped. The times to formations of form-stable gels were noted by inspections after addition of the redox chemicals. Data are as follows, in Table 1a.

TABLE 1a

| Components | Parts added (g. of 100% material) | | | |
|---|---|---|---|---|
| | (a) | (b) | (c) | (d) |
| 5% PVP, K 90 | 2.5 | 2.5 | 2.5 | 2.5 |
| 30% $H_2O_2$ | 0.05 | 0.16 | 0.25 | 0.50 |
| 10% hydrazine | 0.025 | 0.08 | 0.12 | 0.25 |
| Time to gel (mins.) | 115 | 71 | 67 | 39 |

After standing 16 hours at temperature all set to solid ringing gels.

EXAMPLE 2 (FOR COMPARISON)

The water shutoff screening method described above is employed to determine the effectiveness of a commercial water shutoff agent, tetra-2-ethyl hexyl titanate. A solution containing 4.63 g. of tetra-2-ethyl hexyl titanate is prepared in 100 cc. of trichloroethane. This solution is introduced into the input (low) end of a precalibrated, moist Darcy tube packed with 40–60 mesh Ottawa crystal silica and inclined upward at a 40° angle. An additional 100 cc. of trichloroethylene is injected into the Darcy tube to assure proper placement of tetra-2-ethylhexyl titanate in the packed column. After allowing the solution to stand 30 minutes in the permeable horizontally-levelled column, the solution is displaced with water until a constant flow rate is obtained. This constant flow rtae is then used to redetermine the Darcy (K) value of the treated column. The treated column is found to have a Darcy K (value) of 5.6 as compared to a Darcy (K) value of 47 before treatment.

EXAMPLE 3

A composition containing 100 ccs. of 5% polyvinyl pyrrolidone polymer (5 g. by weight), having a molecular weight of 350,000 and a Fikentscher (K) value of 90, 3.3 ccs. of 30% hydrogen peroxide (1 g. by weight), and 5 ccs. of 10% hydrazine solution (0.5 g. by weight), is prepared and injected into a calibrated Darcy tube packed with Ottawa crystal silica in the manner as described in Example 2. This composition is allowed to stand in the tube for 100 minutes. The Darcy (K) value of the horizontally-levelled column after treatment is determined and found to be zero as compared to a Darcy (K) value of 44 before treatment. It is found that this composition produces a slimy plug in the column which completely prevents flow of water through the tube. The results obtained in Example 3 demonstrate the advantages of cross-linked polyvinyl pyrrolidone as a water shutoff agent over those obtained in Example 2 with tetra-2-ethylhexyl titanate, a commercial water shutoff agent.

EXAMPLE 4

In a well where the influx of large amounts of water from a permeable earth formation traversed by the bore hole is interferring with drilling operations, the following procedure may be adopted for permanently sealing the permeable earth formation with the instant polyvinyl pyrrolidone polymer compositions, thereby shutting off the influx of water into the bore hole and greatly facilitating further drilling.

The well is first flushed clean with any conventional dilute acid wash, i.e. hydrochloric acid, dilute acid surfactant, or hydrofluoric acid if sand solids are present. The water zone is then isolated with two nonretrievable, inflatable packers by placing one at the bottom of the water zone and one at the top of the water zone with the drillpipe extending through the upper packer. A solution of polyvinyl pyrrolidone containing 10% by weight of the polyvinyl pyrrolidone polymer having a Fikentscher (K) value of 60, 1% by weight of 30% hydrogen peroxide and 0.5% by weight of 10% hydrazine is pumped down the drillpipe using sufficient pressure, for example, in the range of about 500 to 10,000 p.s.i. so that the composition will penetrate and be squeezed back into the interstices of the permeable formation and fill the communicating pores. After a sufficient period of waiting, for example, one to two hours, the cross-linking of the instant individual molecules of the polyvinyl pyrrolidone polymer causes the formation of a permanent gel and seals the permeable formation to prevent further flow of the unwanted flued, i.e. water.

The drillpipe is then removed and the drill put back into the well for drilling through the newly formed gel and resuming normal standard drilling operations. Upon continuing drilling, the inflow of water into the well is completely stopped or at least so diminished that it is considered insignificant.

The foregoing description and working examples have been limited to methods involving the treatment of permeable earth formations, particularly as present in oil wells, to seal such formations against further penetration of fluids therethrough. The present invention is however also useful for sealing other types of walled systems against fluid passage through its walls, whether the fluid be a liquid or gas. Many such systems are well known, the walls of which may be composed of any material, natural or synethic as for example earth, clay, cement, metal, natural or synthetic polymeric materials, etc. Such systems occur for example in oil and water wells, pipes, conduits, reservoirs (including vessels or containers of any size), aqueous cooling systems for controlling temperatures of adjacent relatively hot systems such as for condensers, exothermic chemical reactions, internal combustion and other thermal engines and the like, regardless of the material of which the walls of such systems are composed. All are at one time or another subject to leakage of desired or undesired fluid into or out of the system. Included among such systems are also sanitary sewage systems, potable water supplies, etc.

The following additional examples illustrate use of the method of the present invention for treatment of other such systems.

EXAMPLE 5

100 parts by weight of a 5% solution of PVP K–90, molecular weight 350,000 is combined with one part by weight of a 30% solution of hydrogen peroxide and one part by weight of a 10% solution of hydrazine. This solution is introduced into a sanitary sewer pipe subject to leakage through the walls thereof in sufficient amount to fill same, and both ends closed. The polymer composition, due to its swelling characteristic, will be forced by internally generated pressure to the internal surface of the pipe and into any porosity in the walls thereof. Within one to two hours, the polymer composition sets to an insoluble gel, permanently sealing the pipe against fluid leakage. For particularly difficult situations, the composition may be pumped into the pipe under any desired pressure such as from 50 to 10,000 p.s.i.

EXAMPLE 6

The solution employed in Example 5 is introduced into the cooling system of a water cooled internal combustion engine in sufficient amount to fill same and the cooling system closed. After one to two hours, an insoluble gel has formed in situ in all porosity present in the walls of the system, thus permanently sealing leaking gaskets, pipes, etc. If desired, this same solution may be introduced into the same cooling system during operation for maintenance purposes to seal any porosity developing during operation.

The above described PVP-hydrazine-hydrogen peroxide compositions, and methods for their manufacture, are disclosed and claimed in U.S. Patent No. 3,294,729, the disclosure of which is accordingly incorporated herein by reference thereto.

It should be understood that other instant polyvinyl pyrrolidone polymer compositions outlined in the above examples as well as minor variations in technique that will become apparent from this specification may be employed to produce like results.

Various modifications and variations of this invention will be obvious to a worker of ordinary skill in the art and it is understood that such modifications and variations are to be included within the spirit and purview of this application and the scope of the appended claims.

We claim:
1. In a method of sealing a walled system against fluid passage through its walls, the improvement which comprises injecting into the system and into any porosity in its walls and aqueous water-shutoff substantially ungelled, non-cross-linked composition, comprising a mixture consisting of
   (1) a 1% to 20% aqueous solution of polyvinyl pyrrolidone polymer having a Fikentscher (K) value of 20 to 150 and
   (2) a catalytic amount of a redox catalyst system consisting essentially of hydrazine and a peroxide polymerization catalyst in a molar ratio of at least two moles of peroxide to one mole of hydrazine.

2. The improvement according to claim 1 wherein the mixture consists of a 5% to 10% aqueous solution of polyvinyl pyrrolidone polymer having a Fikentscher (K) value of 60 to 90.

3. The improvement according to claim 2, wherein the redox catalyst system consists essentially of 2% to 30% hydrogen peroxide by weight of said polyvinyl pyrrolidone polymer and 1% to 10% hydrazine by weight of said polyvinyl pyrrolidone polymer.

4. The improvement according to claim 2, wherein the redox catalyst system consists essentially of 30% hydrogen peroxide by weight of said polyvinyl pyrrolidone and 10% hydrazine by weight of said polyvinyl pyrrolidone polymer.

5. The improvement according to claim 1, wherein the redox catalyst system consists essentially of 2% to 30% hydrogen peroxide by weight of said polyvinyl pyrrolidone polymer and 1% to 10% hydrazine by weight of said polyvinyl pyrrolidone polymer.

6. The improvement according to claim 1 wherein said wall system is a permeable earth formation.

7. The improvement according to claim 1 wherein said walled system is a well penetrating a permeable subterranean formation.

8. The improvement according to claim 1 wherein said walled system is a pipe, conduit or reservoir for handling aqueous liquids.

9. The improvement according to claim 1 wherein said walled system is an aqueous cooling system.

References Cited
UNITED STATES PATENTS

| | | | |
|---|---|---|---|
| 3,061,569 | 10/1962 | Stoner et al. | 61—36 X |
| 3,208,524 | 9/1965 | Horner et al. | 166—294 |
| 3,216,983 | 11/1965 | Shelanski et al. | 260—88.3 |
| 3,282,874 | 11/1966 | Friedrich et al. | 252—72 |
| 3,294,729 | 12/1966 | Hort et al. | 260—88.3 |
| 3,306,870 | 2/1967 | Eilers et al. | 166—295 X |

CHARLES E. O'CONNELL, Primary Examiner

I. A. CALVERT, Assistant Examiner

U.S. Cl. X.R.

61—36; 252—72; 260—29.6